US012123343B1

(12) United States Patent
Savaria et al.

(10) Patent No.: US 12,123,343 B1
(45) Date of Patent: Oct. 22, 2024

(54) INTERNAL COMBUSTION ENGINE WITH COATED IGNITION SYSTEM COMPONENT(S)

(71) Applicant: Pratt & Whitney Canada Corp., Longueuil (CA)

(72) Inventors: Vincent Savaria, Laval (CA); Jean-Gabriel Gauvreau, Varennes (CA); Johnny Vinski, Chateauguay (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/228,968

(22) Filed: Aug. 1, 2023

(51) Int. Cl.

| | |
|---|---|
| ***F02B 77/02*** | (2006.01) |
| ***F02B 53/12*** | (2006.01) |
| ***F02B 55/14*** | (2006.01) |
| ***F02B 77/04*** | (2006.01) |

(52) U.S. Cl.
CPC .............. *F02B 77/02* (2013.01); *F02B 53/12* (2013.01); *F02B 55/14* (2013.01); *F02B 77/04* (2013.01)

(58) Field of Classification Search
CPC .......... F02B 77/02; F02B 77/04; F02B 53/12; F02B 55/14
USPC ....................... 123/270, 271, 272, 273, 45 R
See application file for complete search history.

(56) References Cited

U.S. PATENT DOCUMENTS

| | | | | |
|---|---|---|---|---|
| 4,834,042 | A * | 5/1989 | Wakasa | F02B 19/165 123/270 |
| 5,715,787 | A | 2/1998 | Kawamura | |
| 5,915,351 | A | 6/1999 | Regueiro | |
| 9,334,794 | B2 * | 5/2016 | Gaul | F02B 55/08 |
| 9,353,680 | B2 | 5/2016 | Bruno | |
| 10,041,402 | B2 | 8/2018 | Schulz | |
| 10,125,676 | B2 * | 11/2018 | Thomassin | F01C 1/22 |
| 10,557,407 | B2 * | 2/2020 | Dussault | F01C 1/22 |
| 10,578,012 | B2 * | 3/2020 | Thomassin | F01C 21/183 |
| 11,047,062 | B2 * | 6/2021 | Horie | C23C 4/067 |
| 11,339,671 | B2 * | 5/2022 | Lutz | C23C 4/11 |
| 2017/0167373 | A1 * | 6/2017 | Hong | C23C 4/11 |

FOREIGN PATENT DOCUMENTS

| | | |
|---|---|---|
| JP | 61093227 A | 5/1986 |
| WO | 2011092365 A1 | 8/2011 |

* cited by examiner

*Primary Examiner* — Hai H Huynh
(74) *Attorney, Agent, or Firm* — Getz Balich LLC

(57) ABSTRACT

During a manufacturing method, a protective coating is applied to a first chamber surface of a first component to provide a coated first chamber surface. The protective coating is applied to a second chamber surface of a second component to provide a coated second chamber surface. The second component is configured with the first component to provide a pilot chamber structure. The pilot chamber structure includes a pilot chamber, a pilot aperture, a fuel aperture and an ignitor aperture. The pilot chamber is formed by the coated first chamber surface and the coated second chamber surface within the pilot chamber structure. The pilot aperture projects into the first component from a distal end of the pilot chamber structure to the pilot chamber. The fuel aperture projects into the pilot chamber structure to the pilot chamber. The ignitor aperture projects into the pilot chamber structure to the pilot chamber.

20 Claims, 7 Drawing Sheets

INTERNAL COMBUSTION ENGINE WITH COATED IGNITION SYSTEM COMPONENT(S)

TECHNICAL FIELD

This disclosure relates generally to an internal combustion engine and, more particularly, to an ignition system for the engine.

BACKGROUND INFORMATION

An internal combustion engine includes an ignition system for igniting a fuel-air mixture for combustion. Various types and configurations of ignition systems are known in the art. While these known ignition systems have various benefits, there is still room in the art for improvement.

SUMMARY

According to an aspect of the present disclosure, a method of manufacturing is provided during which a protective coating is applied to a first chamber surface of a first component to provide a coated first chamber surface. The protective coating is applied to a second chamber surface of a second component to provide a coated second chamber surface. The second component is configured with the first component to provide a pilot chamber structure for a powerplant ignition system. The pilot chamber structure includes a pilot chamber, a pilot aperture, a fuel aperture and an ignitor aperture. The pilot chamber is formed by the coated first chamber surface and the coated second chamber surface within the pilot chamber structure. The pilot aperture projects into the first component from a distal end of the pilot chamber structure to the pilot chamber. The fuel aperture projects into the pilot chamber structure to the pilot chamber. The ignitor aperture projects into the pilot chamber structure to the pilot chamber.

According to another aspect of the present disclosure, another method of manufacturing is provided during which a housing for a rotary engine is provided. The housing includes a combustion volume, a structure receptacle, an injector receptacle and an ignitor receptacle. The combustion volume is disposed within the housing. The structure receptacle is configured to receive a pilot chamber structure and projects into the housing to the combustion volume. The injector receptacle is configured to receive a fuel injector and projects into the housing to the structure receptacle. The ignitor receptacle is configured to receive an ignitor and projects into the housing to the structure receptacle. A wear resistant coating is applied to a combustion volume surface of the housing to provide a coated combustion volume surface. The coated combustion volume surface forms the combustion volume within the housing. A protective coating is applied to an inner receptacle surface of the housing to provide a coated inner receptacle surface. The coated inner receptacle surface is contiguous with the coated combustion volume surface. The coated inner receptacle surface forms an inner region of the structure receptacle.

According to still another aspect of the present disclosure, an assembly is provided for a powerplant. This assembly includes a housing, a primary fuel injector and an ignition system. The housing forms a combustion volume. The primary fuel injector is configured to inject primary fuel into the combustion volume. The ignition system is configured to ignite the primary fuel within the combustion volume. The ignition system includes a pilot fuel injector, a pilot ignitor and a pilot chamber structure. The pilot chamber structure includes a pilot chamber and a pilot aperture. The pilot fuel injector is configured to inject pilot fuel into the pilot chamber. The pilot ignitor is configured to ignite the pilot fuel within the pilot chamber. The pilot chamber is fluidly coupled with the combustion volume through the pilot aperture. The pilot chamber structure is received within a structure receptacle in the housing. The structure receptacle projects to the combustion volume. The pilot chamber, the pilot aperture and at least portion of the structure receptacle adjacent the combustion volume are lined with a thermal barrier coating.

The method may also include grinding the coated combustion volume surface following the applying of the protective coating to the inner receptacle surface.

The method may also include removing any wear resistant coating applied to the inner receptacle surface during the applying of the wear resistant coating to the combustion volume surface prior to the applying of the protective coating to the inner receptacle surface.

The protective coating may be configured as or otherwise include a thermal barrier coating.

The protective coating may include a bond coating and a thermal barrier coating over the bond coating.

The method may also include applying the protective coating to an aperture surface of the first component to provide a coated aperture surface. The coated aperture surface may form the pilot aperture.

The method may also include applying the protective coating to an end surface of the first component to provide a coated end surface. The coated end surface may form the distal end of the pilot chamber structure.

The configuring of the second component with the first component may include welding the second component to the first component.

The configuring of the second component with the first component may include inserting at least a portion of the second component into a receptacle in the first component.

The fuel aperture and/or the ignitor aperture may be disposed in the second component and may pierce the coated second chamber surface.

The fuel aperture and/or the ignitor aperture may be disposed in the first component and may pierce the coated first chamber surface.

The pilot chamber may have a spherical geometry.

The first component may be configured from or otherwise include a first metal forming the first chamber surface. The second component may be configured from or otherwise include a second metal forming the second chamber surface.

The method may also include configuring a primary fuel injector and the powerplant ignition system with a housing. The primary fuel injector may be configured to inject primary fuel into a combustion volume within the housing. The powerplant ignition system may be configured to ignite the primary fuel within the combustion volume. The powerplant ignition system may include the pilot chamber structure, a pilot fuel injector and a pilot ignitor. The pilot fuel injector may be arranged with the fuel aperture and may be configured to inject pilot fuel into the pilot chamber. The pilot ignitor may be arranged with the ignitor aperture and may be configured to ignite the pilot fuel within the pilot chamber. The pilot chamber may be fluidly coupled with the combustion volume through the pilot aperture.

The method may also include applying a wear resistant coating to a combustion volume surface of the housing to provide a coated combustion volume surface. The coated combustion volume surface may form the combustion volume within the housing.

The method may also include applying the protective coating to an inner receptacle surface of the housing to provide a coated inner receptacle surface. The coated inner receptacle surface may be contiguous with the coated combustion volume surface. The coated inner receptacle surface may form an inner region of a receptacle which receives the first component.

The method may also include applying the protective coating to at least a portion of an intermediate receptacle surface of the housing to provide a coated intermediate receptacle surface. The coated intermediate receptacle surface may form an intermediate region of the receptacle with a frustoconical geometry.

The method may also include grinding the coated combustion volume surface following the applying of the protective coating to the inner receptacle surface.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
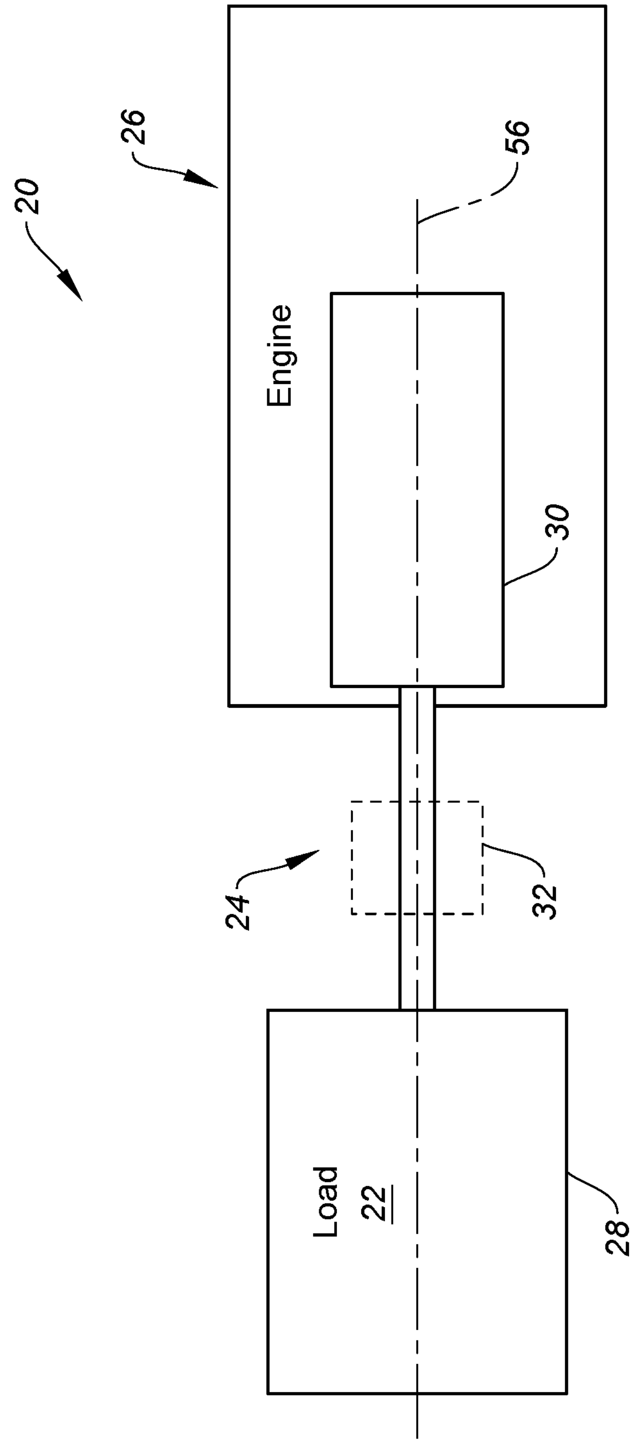
FIG. 1 is a schematic illustration of a powerplant.

FIG. 1 is a schematic illustration of a powerplant 20. This powerplant 20 may be configured for an aircraft. The aircraft may be an airplane, a rotorcraft, a drone (e.g., an unmanned aerial vehicle (UAV)) or any other manned or unmanned aerial vehicle and/or system. Alternatively, the powerplant 20 be configured for a land vehicle, a water vehicle, a stationary application such as a ground-based electrical power generator, or various other mobile and/or stationary applications. However, for ease of description, the powerplant 20 may be generally described below as an aircraft powerplant. The aircraft powerplant 20 of FIG. 1 includes a mechanical load 22, a drivetrain 24 and an internal combustion (IC) engine 26, where the drivetrain 24 mechanically couples the mechanical load 22 to the IC engine 26.

The mechanical load 22 may be configured as or otherwise include a rotor 28 mechanically driven by the IC engine 26 through the drivetrain 24. This driven rotor 28 may be a bladed propulsor rotor where the aircraft powerplant 20 is configured as or otherwise includes a propulsion system for the aircraft. The propulsor rotor may be an open (e.g., un-ducted) propulsor rotor or a ducted propulsor rotor. Examples of the open propulsor rotor include a propeller rotor for a turboprop propulsion system, a rotorcraft rotor (e.g., a main helicopter rotor) for a turboshaft propulsion system, a propfan rotor for a propfan propulsion system, and a pusher fan rotor for a pusher fan propulsion system. An example of the ducted propulsor rotor is a fan rotor for a ducted fan propulsion system. The present disclosure, of course, is not limited to the foregoing exemplary propulsor rotor arrangements. Moreover, the driven rotor 28 may alternatively be a generator rotor of an electric power generator where the aircraft powerplant 20 is (or is part of) an electrical power system for the aircraft; e.g., an auxiliary power unit (APU) for the aircraft.

The drivetrain 24 may be configured as a direct-drive drivetrain. With such a configuration, the driven rotor 28 is operable to rotate at a common (the same) rotational speed as an engine rotating structure 30 of the IC engine 26. Alternatively, the drivetrain 24 may be configured as a geared drivetrain. With such a configuration, the drive rotor is operable to rotate at a different (e.g., faster or slower) rotational speed than the engine rotating structure 30. The drivetrain 24, for example, may include a geartrain 32 (e.g., an epicyclic gear system) and/or another transmission device coupled between the driven rotor 28 and the engine rotating structure 30.

The IC engine 26 may be configured as a rotary engine such as, but not limited to, a Wankel engine. The IC engine 26 of FIG. 2, for example, includes an engine housing 34, an engine rotor 36, a primary fuel injector 38 and an ignition system 40.

Figure 2:
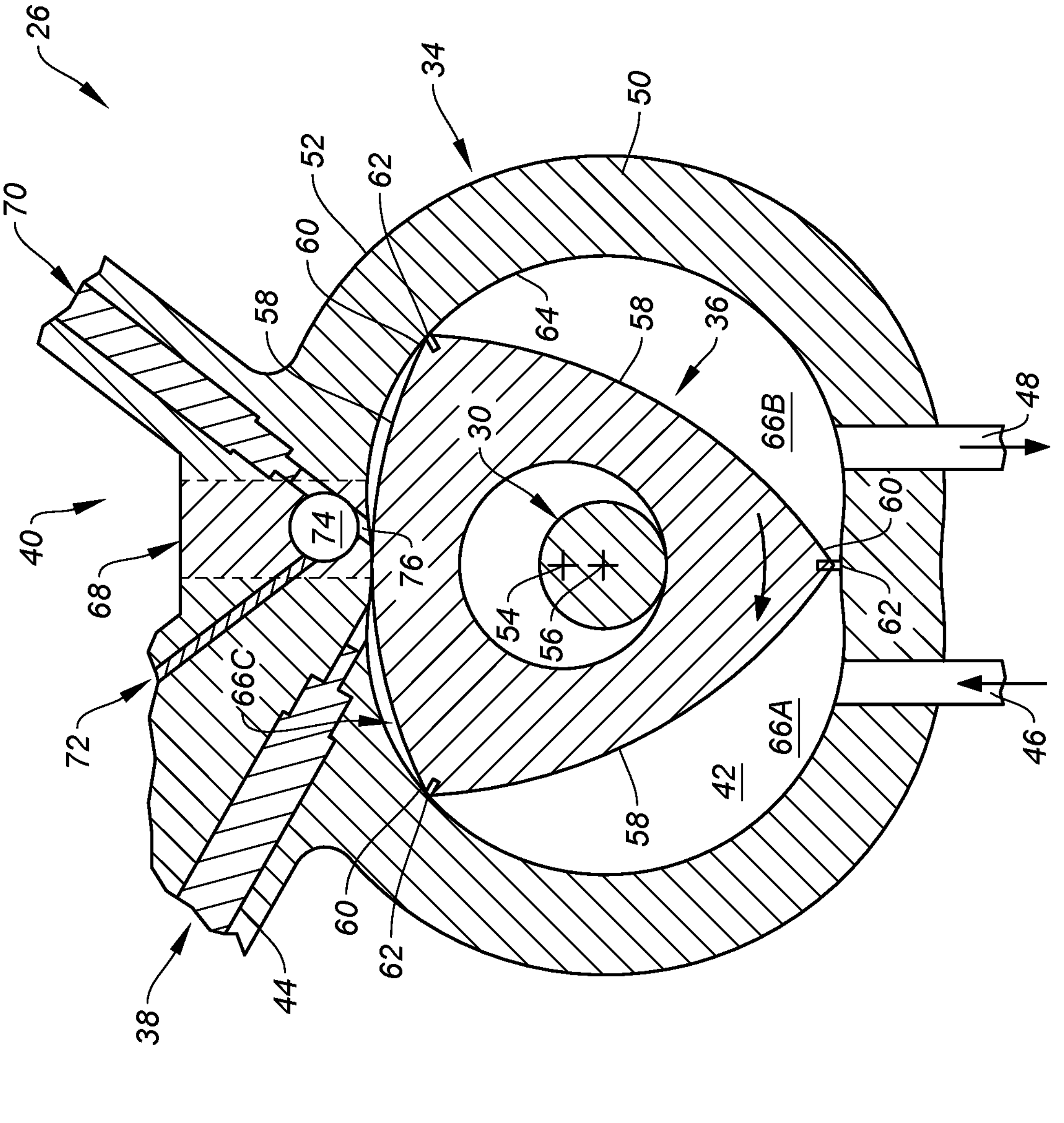
FIG. 2 is a sectional schematic illustration of an internal combustion engine.

The engine housing 34 of FIG. 2 includes an internal housing cavity 42, a primary fuel injector receptacle 44, an air intake passage 46 and a combustion products exhaust passage 48. The engine housing 34 is also configured for mating with the ignition system 40 as described below in further detail. The housing cavity 42 is formed within and enclosed by the engine housing 34. The primary fuel injector receptacle 44 extends through a peripheral wall 50 of the engine housing 34 from an exterior 52 of the engine housing 34 to the housing cavity 42. The intake passage 46 extends from an inlet into the IC engine 26, through the housing peripheral wall 50, to the housing cavity 42, which engine inlet may also be an inlet to the aircraft powerplant 20 (see FIG. 1). The exhaust passage 48 extend from the housing cavity 42, through the housing peripheral wall 50, to an exhaust from the IC engine 26, which engine exhaust may also be an exhaust from the aircraft powerplant 20 (see FIG. 1).

The engine rotor 36 of FIG. 2 is disposed within the housing cavity 42, where the housing peripheral wall 50 extends circumferentially around an outer periphery of the engine rotor 36. The engine rotor 36 is coupled to and rotatable with the engine rotating structure 30. However, the engine rotor 36 of FIG. 2 is eccentric to the engine rotating structure 30. A centerline 54 of the engine rotor 36, for example, is parallel with, but offset from, a centerline 56 of the engine rotating structure 30, where the rotor centerline 54 is also a rotational axis of the engine rotor 36 and/or where the rotating structure centerline 56 is also a rotational axis of the engine rotating structure 30. With this arrangement, as the engine rotor 36 rotates about its rotor centerline 54, the rotor centerline 54 moves (e.g., circles) about the rotating structure centerline 56. Here, a timing gear may be provided to control a rotational velocity of the engine rotor 36 to be slower than (e.g., ⅓ of) a rotational velocity of the engine rotating structure 30.

The engine rotor 36 may have a non-circular, lobed cross-sectional geometry when viewed, for example, in a reference plane perpendicular to the rotor centerline 54. The engine rotor 36 of FIG. 2, for example, includes a plurality of (e.g., arcuate, convex) peripheral rotor faces 58 arranged circumferentially about the rotor centerline 54. Each circumferentially neighboring (e.g., adjacent) pair of the rotor faces 58 meets at a respective apex 60 of the engine rotor 36.

The engine rotor 36 may also include one or more rotor seals 62, where each rotor seal 62 is arranged at (e.g., on, adjacent or proximate) a respective one of the rotor apexes 60. Each rotor seal 62 is configured to sealingly engage (e.g., contact) and thereby form a seal interface with an interior 64 of the housing peripheral wall 50. Of course, the engine rotor 36 may be configured with various other seal elements which are omitted from the drawings for clarity. Examples of these other seal elements include, but are not limited to, gas seal element(s) and/or oil seal element(s) arranged with side faces of the engine rotor 36.

The engine rotor 36 and the engine housing 34 may collectively form one or more combustion volumes 66A-C (generally referred to as "66") (e.g., combustion chambers, working volumes, etc.) within the engine housing 34. Each combustion volume 66, in particular, is formed by and between a respective one of the rotor faces 58 and a corresponding (albeit changing) portion of the housing peripheral wall 50, and circumferentially between a respective neighboring pair of the rotor seals 62. Each of the combustion volumes 66 moves about the centerline 54, 56 as the engine rotor 36 eccentrically rotates within the engine housing 34 and its housing cavity 42. With the rotor position of FIG. 2, the combustion volume 66A is fluidly coupled with the intake passage 46 (and fluidly decoupled from the exhaust passage 48), the combustion volume 66B is fluidly coupled with the exhaust passage 48 (and fluidly decoupled from the intake passage 46), and the combustion volume 66C is fluidly decoupled from the intake passage 46 and the exhaust passage 48.

The primary fuel injector 38 is mated with/received within the primary fuel injector receptacle 44. The primary fuel injector 38, for example, projects into the primary fuel injector receptacle 44 and is threaded into or otherwise attached to the engine housing 34.

During engine operation, air is directed through the intake passage 46 into a respective one of the combustion volumes 66. As the engine rotor 36 rotates within the engine housing 34, a volumetric measure of the respective combustion volume 66 decreases thereby compressing the air within that combustion volume 66. The primary fuel injector 38 directs (e.g., injects) primary fuel into the respective combustion volume 66 to mix with the air as it is being compressed to provide a fuel-air mixture. When the respective combustion volume 66 aligns with the ignition system 40, the fuel-air mixture within that combustion volume 66 is ignited to generate combustion products. As the engine rotor 36 continues to rotate within the engine housing 34, the volumetric measure of the respective combustion volume 66 increases thereby facilitating expansion of the combustion products within the respective combustion volume 66 until those expanded combustion products are exhausted from the IC engine 26 through the exhaust passage 48. Internal combustion pressure loads of the combustion products within the respective combustion volume 66 drives rotation of the engine rotor 36 within the engine housing 34. The rotation of the engine rotor 36 and, thus, the rotation of the engine rotating structure 30 in turn drives rotation of the driven rotor 28 of FIG. 1 through the drivetrain 24.

Referring to FIG. 2, to ignite the fuel-air mixture within one of the combustion volumes 66, the ignition system 40 is configured to introduce a flame (e.g., a pilot flame) and/or relatively hot combustion products into the respective combustion volume 66. The ignition system 40 of FIG. 2, for example, includes a pilot chamber structure 68 (schematically shown), a pilot fuel injector 70 ("pilot injector") and a pilot ignitor 72 (e.g., a spark plug, a glow plug, etc.). The pilot chamber structure 68 includes an internal pilot chamber 74 (e.g., a sub-chamber, a pre-ignition chamber, etc.) and a pilot aperture 76 (e.g., a transfer hole) which fluidly couples the pilot chamber 74 to the respective combustion volume 66. The pilot injector 70 is configured to direct (e.g., inject) pilot fuel into the pilot chamber 74. The pilot ignitor 72 is configured to ignite the pilot fuel within the pilot chamber 74 to generate the pilot flame and/or the pilot combustion products. The pilot flame and/or the pilot combustion products are directed through the pilot aperture 76 into the respective combustion volume (e.g., 66C) to ignite the fuel-air mixture within that combustion volume (e.g., 66C).

Figure 3:
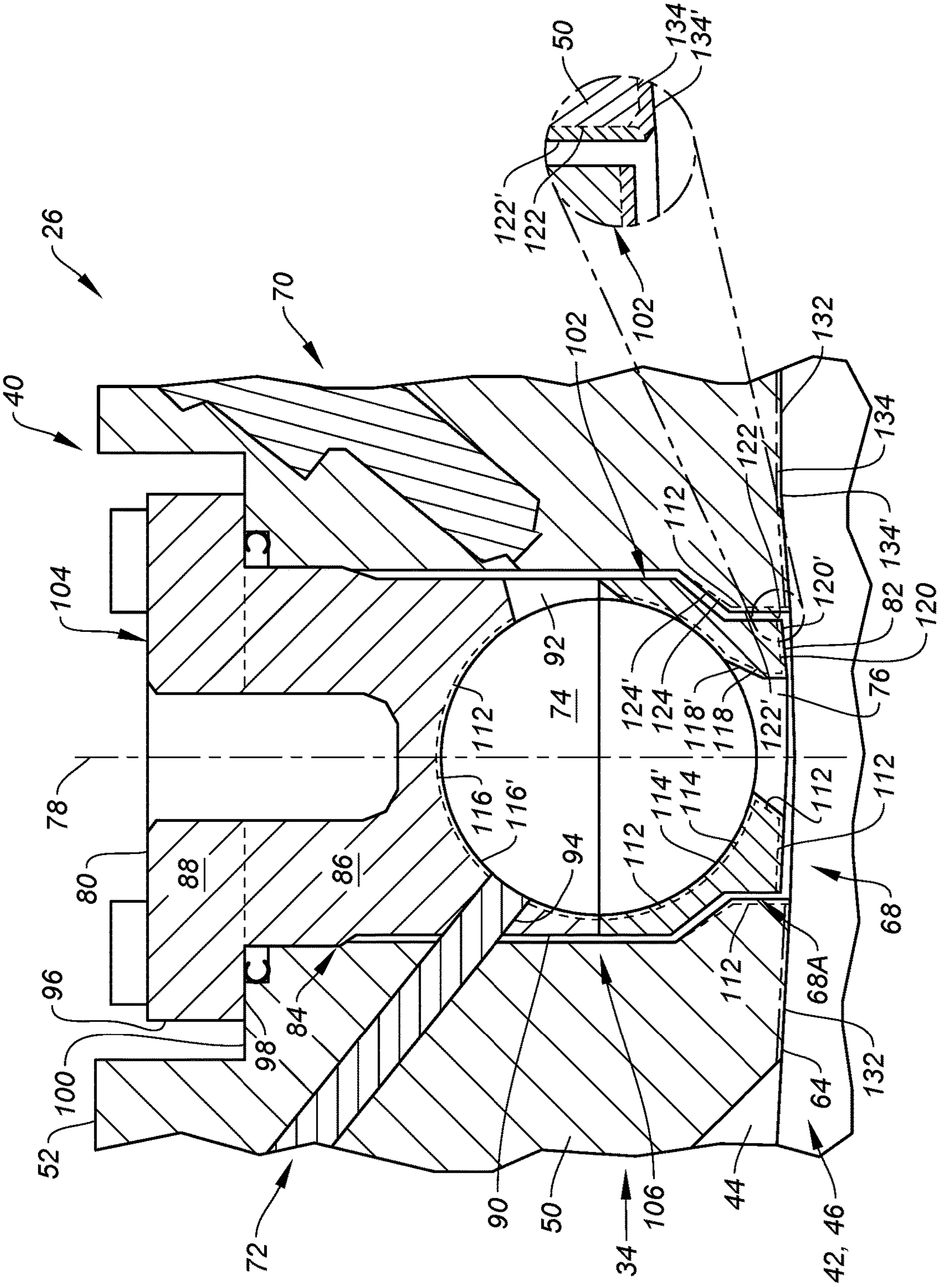
FIGS. 3-5 are partial sectional illustrations of the engine with various ignition system arrangements.

Referring to FIG. 3, the pilot chamber structure 68 extends longitudinally (e.g., radially relative to the axes 54, 56 of FIG. 2) along a longitudinal centerline 78 of the pilot chamber structure 68 between and to an outer end 80 of the pilot chamber structure 68 and an inner end 82 of the pilot chamber structure 68. The pilot chamber structure 68 may be formed as a plug with a T-shaped sectional geometry. The pilot chamber structure 68 may thereby be inserted into (e.g., plugged into) or otherwise mated with a pilot chamber structure receptacle 84 in the engine housing 34. Briefly, this pilot chamber structure receptacle 84 of FIG. 3 projects (e.g., longitudinally along the structure centerline 78) into the engine housing 34, through the housing peripheral wall 50, from the exterior 52 of the engine housing 34 to the housing cavity 42 and a respective one of its combustion volumes 66. The pilot chamber structure 68 of FIG. 3 includes a pilot chamber structure base 86 and a pilot chamber structure mount 88.

The structure base 86 is disposed at the structure inner end 82. The structure base 86 of FIG. 3, for example, projects longitudinally along the structure centerline 78 out from the structure mount 88 to the structure inner end 82. The structure base 86 projects laterally (e.g., radially relative to the structure centerline 78) out to an exterior side 90 of the structure base 86. The pilot chamber 74 is formed within the structure base 86. The pilot chamber 74 of FIG. 3 has a spherical geometry which may facilitate provision of a relatively compact and durable pilot chamber structure. The present disclosure, however, is not limited to such an exemplary pilot chamber geometry. The pilot chamber 74, for example, may alternatively have a cylindrical geometry, a frustoconical geometry, etc. Referring again to FIG. 3, the pilot aperture 76 projects into the structure base 86, through an inner endwall of the pilot chamber structure 68 and its structure base 86, from the structure inner end 82 to the pilot chamber 74. A centerline of the pilot aperture 76 may be angularly offset from the structure centerline 78 by a non-zero acute angle. The present disclosure, however, is not limited to such an exemplary angularly offset pilot aperture arrangement.

The pilot chamber structure 68 and its structure base 86 of FIG. 3 also include a fuel aperture 92 and at least one ignitor aperture 94. The fuel aperture 92 and the ignitor aperture 94 each project laterally into the structure base 86, through an annular sidewall of the pilot chamber structure 68 and its structure base 86, from the base exterior side 90 to the pilot chamber 74. The fuel aperture 92 and the ignitor aperture 94 of FIG. 3 are arranged to opposing lateral side of the pilot chamber 74. The present disclosure, however, is not limited to such an exemplary arrangement.

The structure mount 88 is disposed at the structure outer end 80. The structure mount 88 of FIG. 3, for example, projects longitudinally along the structure centerline 78 out from the structure base 86 to the structure outer end 80. The structure mount 88 also projects laterally out from the structure base 86 and its base exterior side 90 to a (e.g., annular) lateral distal end 96 of the structure mount 88. With this arrangement, the structure mount 88 forms a (e.g., annular) shelf 98 (e.g., an axial seal face) which extends laterally between and to the mount distal end 96 and the base exterior side 90. This shelf 98 may be abutted against or otherwise engaged with a (e.g., annular) shelf 100 of the engine housing 34 along the pilot chamber structure receptacle 84.

The pilot chamber structure 68 may be configured as a multi-component structure; e.g., an assembly of multiple parts. The pilot chamber structure 68 of FIG. 3, for example, includes a first component 102 (e.g., an inner component of the pilot chamber structure 68) and a second component 104 (e.g., an outer component of the pilot chamber structure 68). The first component 102 may be welded or otherwise attached to the second component 104 at an interface 106 (e.g., a seam) longitudinally between the first component 102 and the second component 104.

Figure 4:
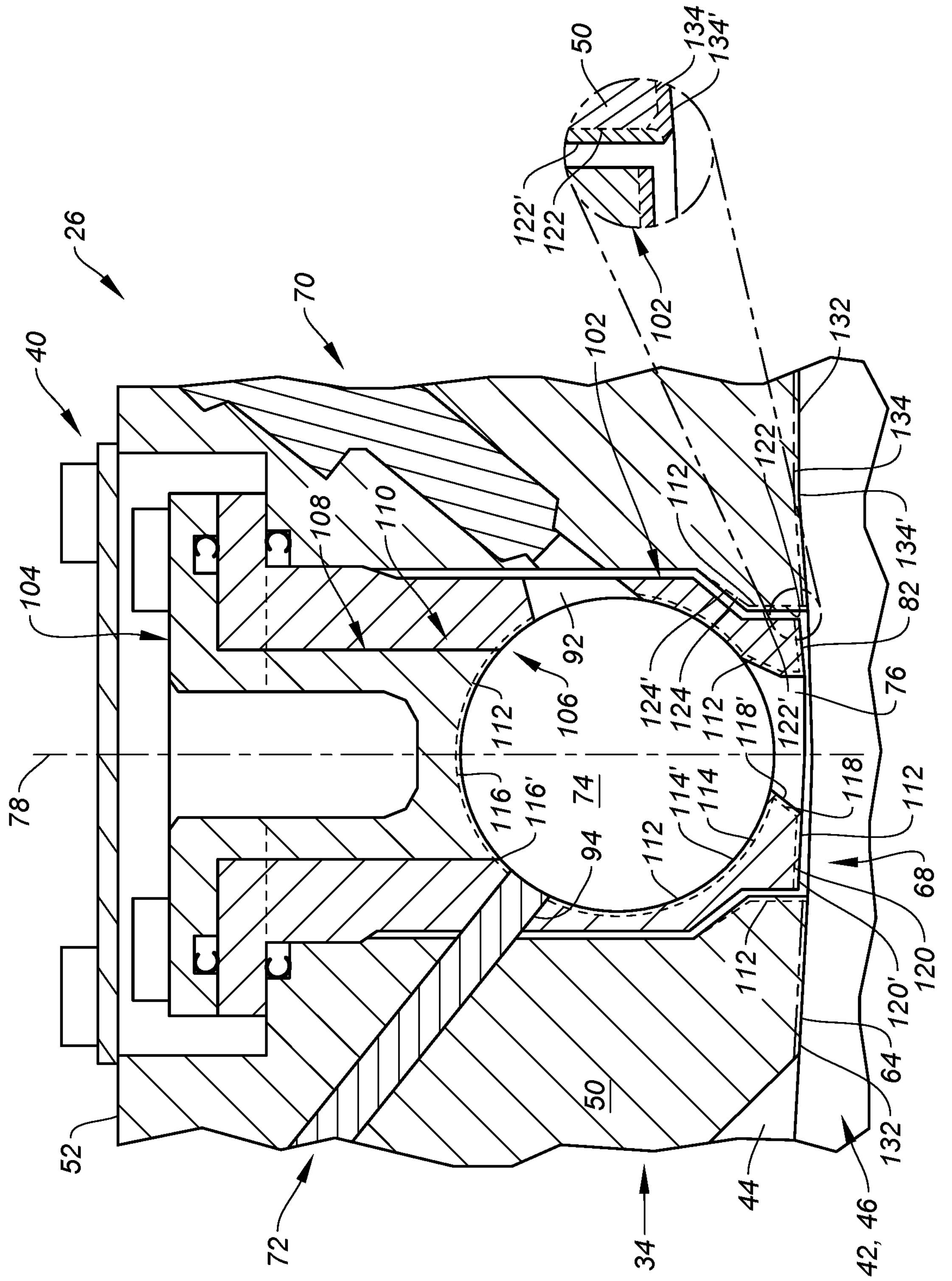
Figure 5:
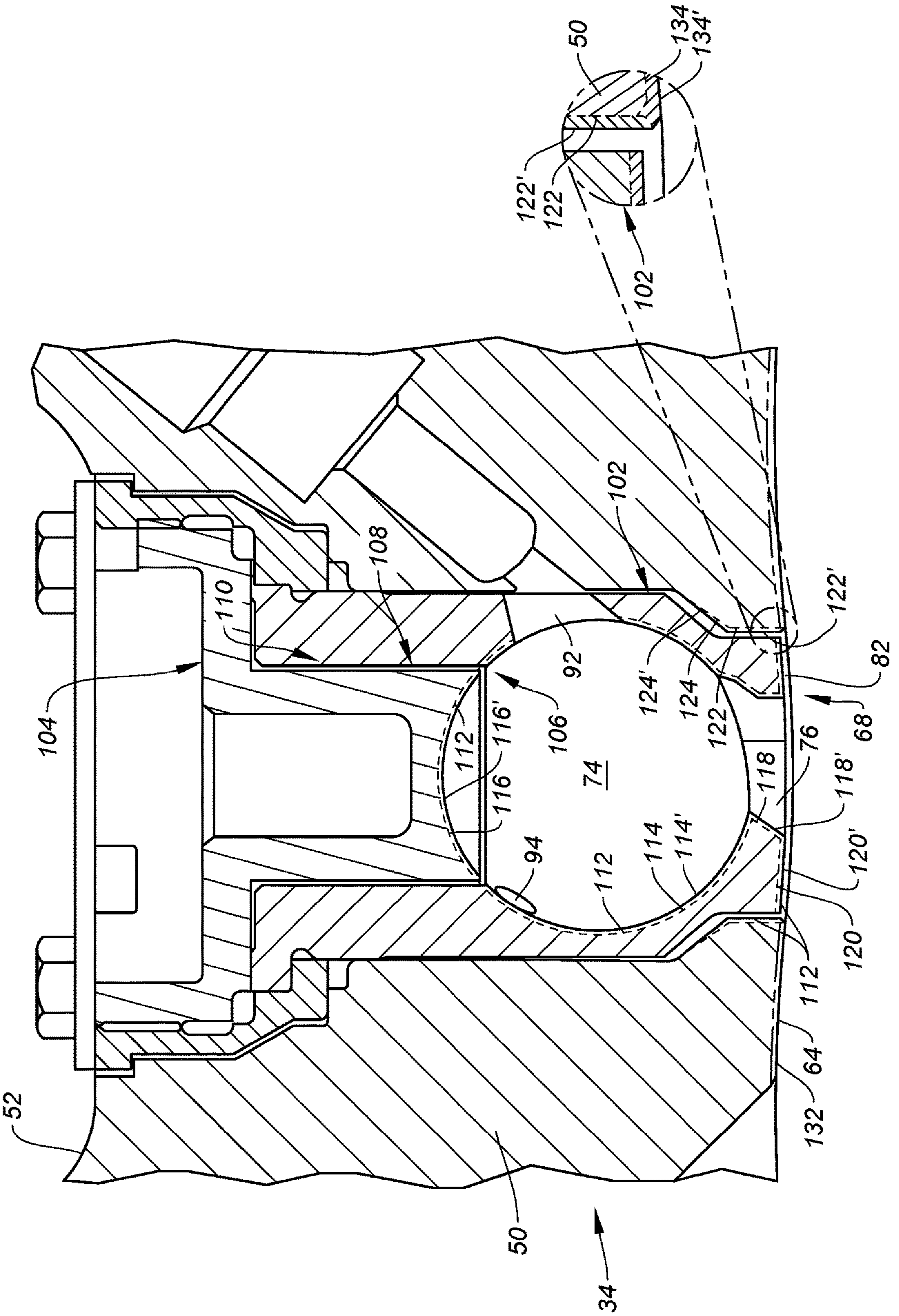

The interface 106 between the first component 102 and the second component 104 may be disposed at an intermediate location longitudinally along the pilot chamber 74; e.g., longitudinally midway along the pilot chamber 74. The first component 102 of FIG. 3, for example, forms a longitudinal inner section of the structure base 86 at the structure inner end 82. This first component 102 includes/forms an inner portion (e.g., a semi-spherical inner half) of the pilot chamber 74 and the pilot aperture 76. The second component 104 of FIG. 3 forms a longitudinal outer section of the structure base 86 as well as the structure mount 88 at the structure outer end 80. This second component 104 includes/forms an outer portion (e.g., a semi-spherical outer half) of the pilot chamber 74, the fuel aperture 92 and the ignitor aperture 94. The present disclosure, however, is not limited to such an exemplary arrangement. For example, referring to FIGS. 4 and 5, the interface 106 between the first component 102 and the second component 104 may be shifted longitudinally towards the structure outer end 80 such that the first component 102 may include/form a majority of the pilot chamber 74. The first component 102 of FIGS. 4 and 5 may also include/form the fuel aperture 92 and the ignitor aperture 94 in addition to the pilot aperture 76. Here, at least a (e.g., plug) portion 108 the second component 104 of FIGS. 4 and 5 is inserted into a second component receptacle 110 in the first component 102, which second component receptacle 110 projects longitudinally into the first component 102 (in a direction towards the structure inner end 82) to the pilot chamber 74. With this arrangement, the first component 102 and the second component 104 may be mechanically fastened to one another when installed with the engine housing 34. Thus, the first component 102 and the second component 104 may be removably attached to one another; e.g., without use of welding or another bonding operation.

Referring to FIGS. 3-5, the pilot chamber structure 68 and its first component 102 and its second component 104 may be constructed from a metal; e.g., a pure metal or a metal alloy. Examples of this metal include, but are not limited to, a nickel alloy or a cobalt alloy, or the like. The first component 102 and the second component 104 may each be cast, machined, additively manufactured and/or otherwise formed from the metal as a discrete monolithic body. Following this formation, one or more finishing operations such as grinding, sanding, polishing, coating, etc. are performed to the first component 102 and the second component 104. The first component 102 and the second component 104 may subsequently be assembled to provide the pilot chamber structure 68.

Referring to FIG. 2, the combustion of the pilot fuel within the pilot chamber 74 may be continuous (e.g., sustained) throughout an engine cycle. Here, the term "engine cycle" may describe a cycle as the engine rotor 36 makes a (e.g., single) complete rotation about the rotor centerline 54 within the engine housing 34. The continuous combustion within the pilot chamber 74 may subject the pilot chamber structure 68 to relatively high thermal loads, particularly a portion of the pilot chamber 74 adjacent and partially forming the respective combustion volume 66. Such high thermal loads may cause relatively high compressive stresses within the pilot chamber structure 68 which may affect pilot chamber structure durability. Moreover, the high thermal loads paired with a relatively high velocity fluid flow associated with directing the flame and/or the combustion products through the pilot aperture 76 into the respective combustion volume 66 may erode material of the pilot chamber structure 68 forming the pilot aperture 76.

To reduce thermal loads on and/or erosion of the metal forming the pilot chamber structure 68 of FIG. 3 and one or more of its components 102 and 104 (see also FIGS. 4 and 5), one or more regions of the pilot chamber structure 68 may be lined (e.g., coated) with a protective coating 112; e.g., a coating or coating system with a thermal barrier coating (TBC) material. For example, the pilot chamber 74, the pilot aperture 76 and/or the structure inner end 82 may be lined with the protective coating 112.

A first chamber surface 114 of the first component 102 may be (e.g., completely) lined with the protective coating 112 to provide the first component 102 with a coated first chamber surface 114'. A second chamber surface 116 of the second component 104 may be (e.g., completely) lined with the protective coating 112 to provide the second component 104 with a coated second chamber surface 116'. The coated first chamber surface 114' and the coated second chamber surface 116' may collectively form an outer peripheral boundary of the pilot chamber 74 within the pilot chamber structure 68. In the embodiments of FIG. 3, the pilot aperture 76 pierces the coated first chamber surface 114', and the fuel aperture 92 and the ignitor aperture 94 each pierce the coated second chamber surface 116'. In the embodiments of FIGS. 4 and 5, each of the apertures 92, 94 may pierce the coated first chamber surface 114'.

Referring to FIG. 3, a pilot aperture surface 118 of the first component 102 may be (e.g., completely) lined with the protective coating 112 to provide the first component 102 with a coated pilot aperture surface 118'. This coated pilot aperture surface 118' forms an outer peripheral boundary of the pilot aperture 76 from the pilot chamber 74 to the structure inner end 82. This coated pilot aperture surface 118' may extend to and may be contiguous with the coated first chamber surface 114'.

An end surface 120 of the first component 102 at the structure inner end 82 may be (e.g., completely) lined with the protective coating 112 to provide the first component 102 with a coated end surface 120'. This coated end surface 120' may form a distal end of the pilot chamber structure 68 at the structure inner end 82. Here, the coated end surface 120' substantially plugs an opening 68A of the pilot chamber structure receptacle 84 within the engine housing 34 to the housing cavity 42, and is thereby arranged along and is exposed to combustion product within the respective combustion volume 66. The pilot aperture 76 pierces the coated end surface 120'. The coated end surface 120' may thereby extend to and may be contiguous with the coated pilot aperture surface 118'.

One or more regions of the engine housing 34 may also (or alternatively) be lined with the protective coating 112. For example, at least a portion of the pilot chamber structure receptacle 84 adjacent the housing cavity 42 and its respective combustion volume 66 may be lined with the protective coating 112. In particular, a (e.g., cylindrical) inner receptacle surface 122 of the engine housing 34 and its housing peripheral wall 50 may be (e.g., completely) lined with the protective coating 112 to provide the engine housing 34 with a coated inner receptacle surface 122'. This coated inner receptacle surface 122' may form an (e.g., cylindrical) end portion of the pilot chamber structure receptacle 84 adjacent the housing cavity 42. A (e.g., frustoconical) intermediate receptacle surface 124 of the engine housing 34 and its housing peripheral wall 50 may be (partially or completely) lined with the protective coating 112 to provide the engine housing 34 with a coated intermediate receptacle surface 124'. This coated intermediate receptacle surface 124' may form an (e.g., frustoconical) intermediate portion of the pilot chamber structure receptacle 84 adjacent the end portion of the pilot chamber structure receptacle 84. Note, the protective coating 112 on the intermediate receptacle surface 124 may be tapered and/or partially incomplete (e.g., uncoated) where, for example, the intermediate receptacle surface 124 is coated via overspray from coating the inner receptacle surface 122. Here, the protective coating 112 along the surfaces 122 and 124 may protect the (e.g., aluminum) engine housing 34 from high heat loads coming from the hot pilot chamber structure 68. The protective coating 112 along the surfaces 122 and 124 may thereby increase durability and/or (e.g., maximum) power rating of the IC engine 26.

Figure 6:
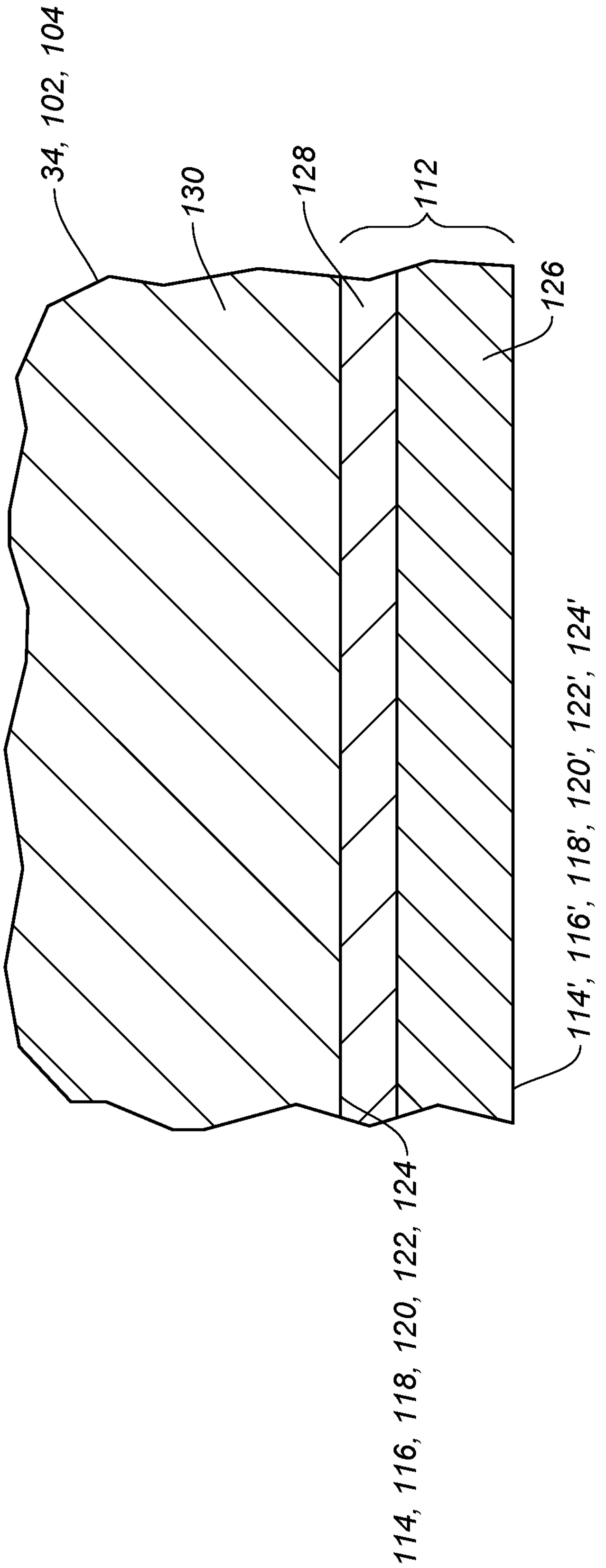
FIG. 6 is a partial sectional illustration of a protective coating on a substrate.

Referring to FIG. 6, the protective coating 112 may include a thermal barrier coating 126 and a bond coating 128 between the thermal barrier coating 126 and a base substrate 130; e.g., the base metal forming the element 34, 102, 104. The bond coating 128 is configured to promote bonding between the base substrate 130 and the thermal barrier coating 126. The thermal barrier coating 126 is configured to provide a thermal barrier for the base substrate 130. The thermal barrier coating 126 may also protect the pilot chamber structure 68 from oxidation and/or hot corrosion; e.g., high temperatures and combustion. Here, the bond coating 128 may (e.g., completely or partially) cover a surface of interest on the base substrate 130. The thermal barrier coating 126 may (e.g., completely or partially) cover the bond coating 128. The thermal barrier coating 126 may be a ceramic such as, but not limited to, yttrium oxide-stabilized zirconium oxide. The bond coat may be a nickel-based bond coat.

Referring to FIG. 3, the interior 64 of the engine housing 34 may also be (e.g., partially or completely) lined with a wear resistant coating 132; e.g., an anti-wear coating. The wear resistant coating 132 may be a hard chromium carbide with a nickel matrix applied by a high velocity oxygen fuel (HVOF) coating process. A combustion volume surface 134 of the engine housing 34, for example, may be lined with the wear resistant coating 132 to provide a coated combustion volume surface 134'. This coated combustion volume surface 134' may form an outer peripheral boundary of the housing cavity 42 and its combustion volumes 66. The pilot chamber structure receptacle 84 pierces the coated combustion volume surface 134'. The coated combustion volume surface 134' may thereby extend to and may be contiguous with the coated pilot aperture surface 122'.

Figure 7:
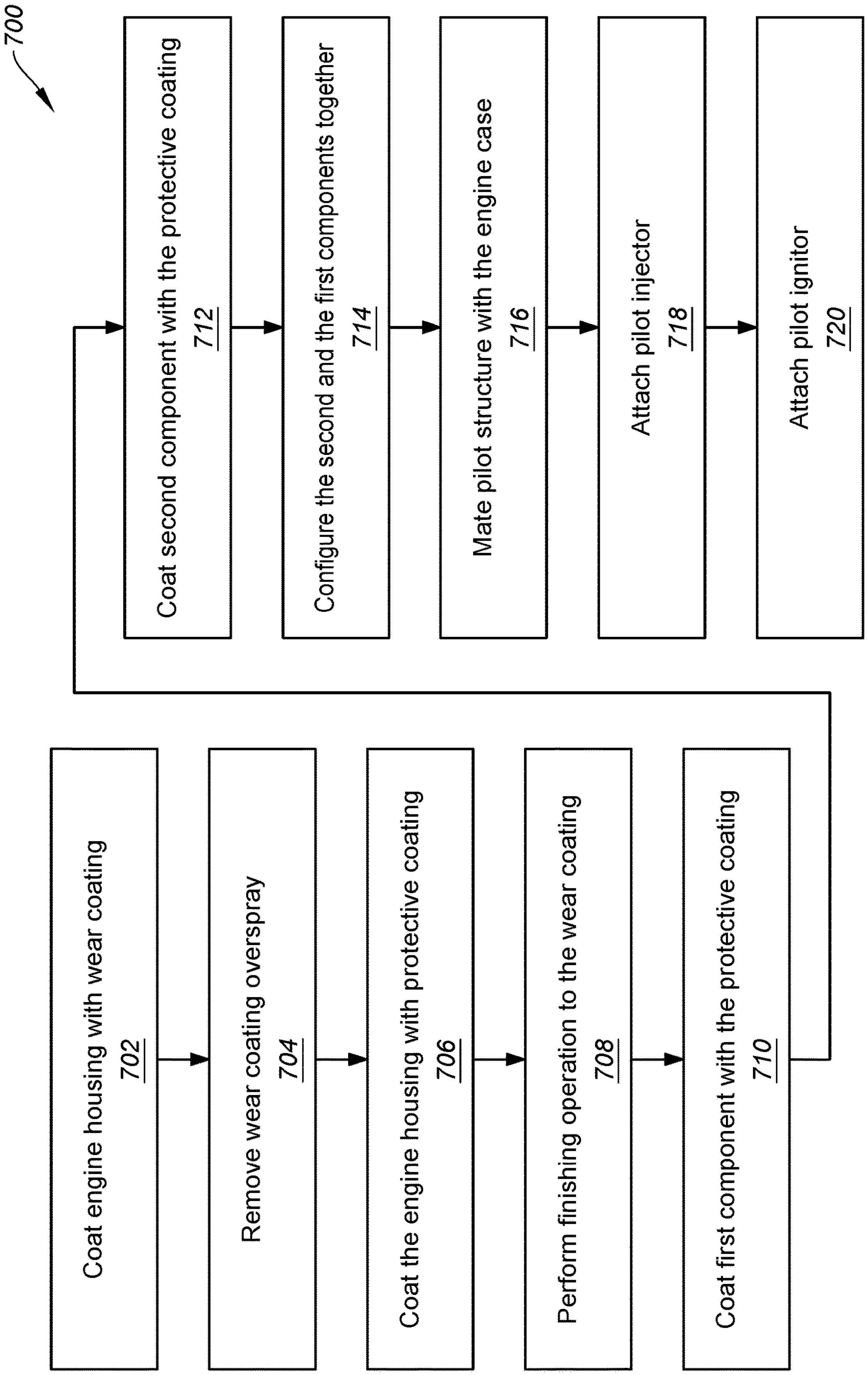
FIG. 7 is a flow diagram of a method of manufacturing.

FIG. 7 is a flow diagram of a method 700 of manufacturing. For ease of description, this manufacturing method 700 may be described below with respect to the powerplant arrangement of FIGS. 2 and 3. The present disclosure, however, is not limited to such an exemplary powerplant arrangement. For example, the manufacturing method 700 may alternatively be performed for the powerplant arrangement of FIG. 4, the powerplant arrangement of FIG. 5, or various other powerplant arrangements.

In step 702, the engine housing 34 along the housing cavity 42 is lined (e.g., coated) with the wear resistant coating 132. The wear resistant coating 132, for example, may be applied to some or all of the combustion volume surface 134 to provide the coated combustion volume surface 134'. The wear resistant coating 132 may be applied, for example, using a thermal spraying process; e.g., a high velocity oxygen fuel (HVOF) coating process.

During the coating step 702, an opening to the pilot chamber structure receptacle 84 may be open; e.g., unmasked. Overspray from the application of the wear resistant coating 132 therefore may enter the pilot chamber structure receptacle 84 and coat the inner receptacle surface 122 at the opening 68A. In step 704, this over sprayed wear resistant coating may be removed from the inner receptacle surface 122. The portion of the pilot chamber structure receptacle 84 along the inner receptacle surface 122, for example, may be re-drilled or otherwise machined; e.g., back to bare metal. In another example, the inner receptacle surface 122 may be grit blasted to partially or completely remove the over sprayed wear resistant coating. During this grit blasting, a shadow mask may be used to protect the wear resistant coating 132 along an edge of the pilot chamber structure receptacle 84. Alternatively, the pilot chamber structure receptacle 84 may be sized to tolerate a certain amount of wear resistant coating overspray on the inner receptacle surface 122. Still alternatively, the opening to the pilot chamber structure receptacle 84 may be masked off prior to the application of the wear resistant coating 132. Where a mask is used, however, caution should be taken to prevent chipping of the wear resistant coating 132 along the edge of the pilot chamber structure receptacle 84 when removing the masking material. Note, by removing the over sprayed wear resistant coating rather than masking off the pilot chamber structure receptacle 84, a likelihood of damaging the wear resistant coating 132 may be significantly reduced.

In step 706, the engine housing 34 along the pilot chamber structure receptacle 84 is lined (e.g., coated) with the protective coating 112. The protective coating 112, for example, may be applied to some or all of the inner receptacle surface 122 to provide the coated inner receptacle surface 122'. Where the protective coating 112 includes the bond coating 128 and the thermal barrier coating 126 (see FIG. 6), the bond coating 128 is first applied to the inner receptacle surface 122. During this application of the bond coating 128, overspray of the bond coating 128 may also coat some or all of the intermediate receptacle surface 124. Note, there may also be some overspray on the coated combustion volume surface 134'. Following application of the bond coating 128, the thermal barrier coating 126 is applied to the bond coating 128 on the inner receptacle surface 122. During this application of the thermal barrier coating 126, overspray of the thermal barrier coating 126 may also coat some or all of the (e.g., overspray) bond coat on the intermediate receptacle surface 124. The application of the protective coating 112 to the inner receptacle surface 122 may thereby also result in an application of the protective coating 112 to some or all of the intermediate receptacle surface 124 and provide the coated intermediate receptacle surface 124'. Of course, in other embodiments, it is contemplated the protective coating 112 may be directly applied to the intermediate receptacle surface 124. The bond coating 128 and/or the thermal barrier coating 126 (or, more generally the protective coating 112) may be applied using various coating techniques such as, but not limited to, plasma spraying process, a high velocity oxygen fuel (HVOF) coating process, a high velocity air fuel (HVAF) coating process, a hybrid high velocity air fuel (HVAF) coating process, etc.

During the step 706, there may also be some overspray of the protective coating 112 on the coated combustion volume surface 134'. This overspray, particularly at an edge between the surfaces 122' and 134', may be beneficial. The overspray of the protective coating 112, for example, may wrap around the edge and provide additional spalling resistance for the coated combustion volume surface 134', as compared to if the inner receptacle surface 122 was uncoated.

In step 708, one or more finishing operations are performed to the coated combustion volume surface 134' to provide a finished coated combustion volume surface. The coated combustion volume surface 134', for example, may be ground and/or otherwise machined to provide the coated combustion volume surface 134' with a select surface finish and/or provide the wear resistant coating 132 with a select coating thickness. During the finishing operation(s), overspray of the protective coating 112 over the wear resistant coating 132 along the edge of the pilot chamber structure receptacle 84 may be removed.

In step 710, the first component 102 is lined with the protective coating 112. The protective coating 112, for example, may be applied to some or all of the first chamber surface 114 to provide the coated first chamber surface 114'. The protective coating 112 may be applied to some or all of the pilot aperture surface 118 to provide the coated pilot aperture surface 118'. The protective coating 112 may be applied to some or all of the end surface 120 to provide the coated end surface 120'. Where the protective coating 112 includes the bond coating 128 and the thermal barrier coating 126 (see FIG. 6), the bond coating 128 is first applied to the first chamber surface 114, the pilot aperture surface 118 and/or the end surface 120. Following application of the bond coating 128, the thermal barrier coating 126 is applied to the bond coating 128 on the first chamber surface 114, the pilot aperture surface 118 and/or the end surface 120. The bond coating 128 and/or the thermal barrier coating 126 (or, more generally the protective coating 112) may be applied using various coating techniques such as, but not limited to, plasma spraying process, a high velocity oxygen fuel (HVOF) coating process, a high velocity air fuel (HVAF) coating process, a hybrid high velocity air fuel (HVAF) coating process, etc.

In step 712, the second component 104 is lined with the protective coating 112. The protective coating 112, for example, may be applied to some or all of the second chamber surface 116 to provide the coated second chamber surface 116'. Where the protective coating 112 includes the bond coating 128 and the thermal barrier coating 126 (see FIG. 6), the bond coating 128 is first applied to the second chamber surface 116. Following application of the bond coating 128, the thermal barrier coating 126 is applied to the bond coating 128 on the second chamber surface 116. The bond coating 128 and/or the thermal barrier coating 126 (or, more generally the protective coating 112) may be applied using various coating techniques such as, but not limited to, plasma spraying process, a high velocity oxygen fuel (HVOF) coating process, a high velocity air fuel (HVAF) coating process, a hybrid high velocity air fuel (HVAF) coating process, etc.

In step 714, the second component 104 is configured (e.g., assembled) with the first component 102 to provide the pilot chamber 74. An engagement surface of the second component 104 of FIG. 3, for example, may be longitudinally abutted against an engagement surface of the first component 102. The second component 104 may then be welded and/or otherwise attached to the first component 102 at the interface 106 to provide a weld seam along the interface 106. Alternatively, the second component 104 of FIGS. 4 and 5 may be inserted into the first component 102 and then mechanically fastened or otherwise attached to one another.

In step 716, the pilot chamber structure 68 is mated with the pilot chamber structure receptacle 84. The pilot chamber structure 68 of FIG. 3, for example, is inserted into the pilot chamber structure receptacle 84 and may be mechanically fastened and/or otherwise attached to the engine housing 34.

In step 718, the pilot injector 70 of FIG. 3 is attached to the engine housing 34. This pilot injector 70 is configured to direct the pilot fuel into the pilot chamber 74 through the fuel aperture 92 in the pilot chamber structure 68 and its second component 104 (or the first component 102 of FIGS. 4 and 5).

In step 720, the pilot ignitor 72 is attached to the engine housing 34. This pilot ignitor 72 is received in (e.g., projects into or through) the ignitor aperture 94 in the pilot chamber structure 68 and its second component 104 (or the first component 102 of FIGS. 4 and 5). The pilot ignitor 72 may thereby extend to or into the pilot chamber 74 for igniting the pilot fuel within the pilot chamber 74.

In some embodiments, referring to FIGS. 3-5, the pilot chamber structure 68 may be configured for installation with and/or removal from the IC engine 26 and its engine housing 34 (e.g., completely) from an exterior of the IC engine 26 and its engine housing 34. Thus, assembly and/or maintenance personnel may not need access to an interior of the IC engine 26 and its engine housing 34 for pilot chamber structure installation, inspection and/or removal. Removing the pilot chamber structure 68 may also facilitate inspection of one or more elements internal to the IC engine 26; e.g., the rotor seal 62 of FIG. 2, the interior 64 of the housing peripheral wall 50 of FIG. 2, the rotor faces 58 of FIG. 2, etc. This may simplify engine assembly, inspection and/or maintenance.

The ignition system 40 is described above with reference to the rotary engine; e.g., the Wankel engine. It is contemplated, however, the ignition system 40 may alternatively be configured with various other types of engines such as a reciprocating piston engine or a gas turbine engine. The present disclosure therefore is not limited to any particular engine types or configurations.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A method of manufacturing, comprising:

applying a protective coating to a first chamber surface of a first component to provide a coated first chamber surface;

applying the protective coating to a second chamber surface of a second component to provide a coated second chamber surface; and configuring the second component with the first component to provide a pilot chamber structure for a powerplant ignition system, the pilot chamber structure including a pilot chamber, a pilot aperture, a fuel aperture and an ignitor aperture, the pilot chamber formed by the coated first chamber surface and the coated second chamber surface within the pilot chamber structure, the pilot aperture projecting into the first component from a distal end of the pilot chamber structure to the pilot chamber, the fuel aperture projecting into the pilot chamber structure to the pilot chamber, and the ignitor aperture projecting into the pilot chamber structure to the pilot chamber;

wherein the fuel aperture is disposed in the first component or the second component and pierces the coated first chamber surface or the coated second chamber surface.

2. The method of claim 1, wherein the protective coating comprises a thermal barrier coating.

3. The method of claim 1, wherein the protective coating comprises a bond coating and a thermal barrier coating over the bond coating.

4. The method of claim 1, further comprising applying the protective coating to an aperture surface of the first component to provide a coated aperture surface, the coated aperture surface forming the pilot aperture.

5. The method of claim 1, further comprising applying the protective coating to an end surface of the first component to provide a coated end surface, the coated end surface forming the distal end of the pilot chamber structure.

6. The method of claim 1, wherein the configuring of the second component with the first component comprises welding the second component to the first component.

7. The method of claim 1, wherein the configuring of the second component with the first component comprises inserting at least a portion of the second component into a receptacle in the first component.

8. The method of claim 1, wherein at least one of the fuel aperture of and the ignitor aperture is disposed in the second component and pierces the coated second chamber surface.

9. The method of claim 1, wherein at least one of the fuel aperture of and the ignitor aperture is disposed in the first component and pierces the coated first chamber surface.

10. The method of claim 1, wherein the pilot chamber has a spherical geometry.

11. The method of claim 1, wherein the first component comprises a first metal forming the first chamber surface; and the second component comprises a second metal forming the second chamber surface.

12. The method of claim 1, further comprising:

configuring a primary fuel injector and the powerplant ignition system with a housing;

the primary fuel injector configured to inject primary fuel into a combustion volume within the housing;

the powerplant ignition system configured to ignite the primary fuel within the combustion volume, and the powerplant ignition system including the pilot chamber structure, a pilot fuel injector and a pilot ignitor;

the pilot fuel injector arranged with the fuel aperture and configured to inject pilot fuel into the pilot chamber;

the pilot ignitor arranged with the ignitor aperture and configured to ignite the pilot fuel within the pilot chamber; and the pilot chamber fluidly coupled with the combustion volume through the pilot aperture.

13. The method of claim 12, further comprising applying a wear resistant coating to a combustion volume surface of the housing to provide a coated combustion volume surface, the coated combustion volume surface forming the combustion volume within the housing.

14. The method of claim 13, further comprising applying the protective coating to an inner receptacle surface of the housing to provide a coated inner receptacle surface, the coated inner receptacle surface contiguous with the coated combustion volume surface, and the coated inner receptacle surface forming an inner region of a receptacle which receives the first component.

15. The method of claim 14, further comprising applying the protective coating to at least a portion of an intermediate receptacle surface of the housing to provide a coated intermediate receptacle surface, the coated intermediate receptacle surface forming an intermediate region of the receptacle with a frustoconical geometry.

16. The method of claim 14, further comprising grinding the coated combustion volume surface following the applying of the protective coating to the inner receptacle surface.

17. A method of manufacturing, comprising:

providing a housing for a rotary engine, the housing including a combustion volume, a structure receptacle, an injector receptacle and an ignitor receptacle, the combustion volume disposed within the housing, the structure receptacle configured to receive a pilot chamber structure and projecting into the housing to the combustion volume, the injector receptacle configured to receive a fuel injector and projecting into the housing to the structure receptacle, and the ignitor receptacle configured to receive an ignitor and projecting into the housing to the structure receptacle;

applying a wear resistant coating to a combustion volume surface of the housing to provide a coated combustion volume surface, the coated combustion volume surface forming the combustion volume within the housing; and applying a protective coating to an inner receptacle surface of the housing to provide a coated inner receptacle surface, the coated inner receptacle surface contiguous with the coated combustion volume surface, and the coated inner receptacle surface forming an inner region of the structure receptacle.

18. The method of claim 17, further comprising grinding the coated combustion volume surface following the applying of the protective coating to the inner receptacle surface.

19. The method of claim 17, further comprising removing any wear resistant coating applied to the inner receptacle surface during the applying of the wear resistant coating to the combustion volume surface prior to the applying of the protective coating to the inner receptacle surface.

20. An assembly for a powerplant, comprising:

a housing forming a combustion volume;

a primary fuel injector configured to inject primary fuel into the combustion volume; and an ignition system configured to ignite the primary fuel within the combustion volume, the ignition system including a pilot fuel injector, a pilot ignitor and a pilot chamber structure, and the pilot chamber structure including a pilot chamber and a pilot aperture;

the pilot fuel injector configured to inject pilot fuel into the pilot chamber;

the pilot ignitor configured to ignite the pilot fuel within the pilot chamber; and the pilot chamber fluidly coupled with the combustion volume through the pilot aperture;

wherein the pilot chamber structure is received within a structure receptacle in the housing, and the structure receptacle projects to the combustion volume; and wherein the pilot chamber, the pilot aperture and at least portion of the structure receptacle adjacent the combustion volume are lined with a bond coating and a thermal barrier coating over the bond coating.

* * * * *